(No Model.)

P. J. ROCK.
SNAP HOOK.

No. 586,397. Patented July 13, 1897.

Witnesses
E. G. McKee
L. M. Graves.

Inventor,
Peter J. Rock,
by John Wedderburn
Attorney

UNITED STATES PATENT OFFICE.

PETER J. ROCK, OF SUPERIOR, WISCONSIN.

SNAP-HOOK.

SPECIFICATION forming part of Letters Patent No. 586,397, dated July 13, 1897.

Application filed July 8, 1896. Serial No. 598,453. (No model.)

*To all whom it may concern:*

Be it known that I, PETER J. ROCK, a citizen of the United States, residing at Superior, in the county of Douglas and State of Wisconsin, have invented certain new and useful Improvements in Snap-Hooks; and I do hereby declare the following to be a full, clear, and exact description of the invention, such as will enable others skilled in the art to which it appertains to make and use the same.

My invention relates to snap-hooks, the object of the same being to cheapen, simplify, and otherwise improve the construction of these devices as now made.

My improved device is made up of a main hook formed of two substantially parallel strands of wire, with the shank thereof extending rearwardly and merging into a loop or other analogous device to which a strap may be attached, and a supplemental hook whose shank extends downwardly from the loop portion between the strands of wire constituting the shank of said main hook and whose hook portion proper extends rearwardly or in a direction opposite to that of the main hook.

The device is preferably constructed of a single piece of wire.

Figure 1:
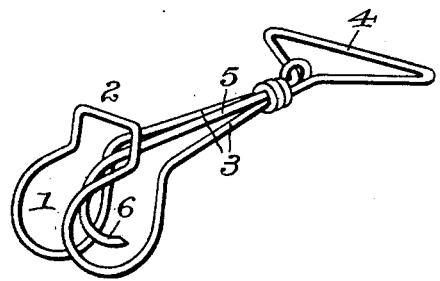
Figure 2:
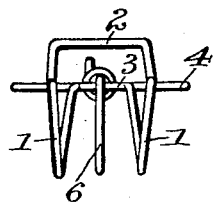
Figure 3:
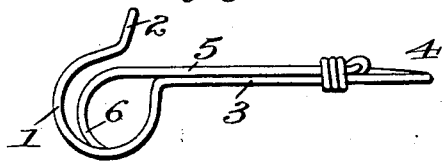

In the drawings forming part of this specification, Figure 1 represents a perspective view of my improved hook. Fig. 2 is a front elevation of the same. Fig. 3 is a side elevation.

Like reference-numerals indicate like parts in the different views.

My improved hook is preferably formed of a single strand of wire and is made with the main-hook portion 1 generally circular in form, with an outwardly-extending projection 2, the two strands of which are substantially parallel one with the other. Its shank 3, of two strands of wire, extends rearwardly and merges into a loop, ring, or other analogous device 4, to which a strap may be attached. Extending from the loop or ring 4 is the shank 5 of a supplemental hook 6, which fits between the two sides of the main hook and has its hook portion proper extending rearwardly or in a direction opposite to that of the main hook.

When the device is made of a single strand of wire, the supplemental hook is formed of one end, and the opposite end thereof is coiled around the shanks 3 and 5 at a point adjacent to the loop or ring 4.

In using my hook the bit or other device to be caught thereby is snapped into the main-hook portion 1 in the usual manner and is passed rearwardly beneath the supplemental hook 6, so that its movements in all directions are cut off and it will be impossible for the same to become detached accidentally. When it is desired to remove the same, the spring-shank 5 of the supplemental hook is thrown outwardly in the direction of the projection, permitting the bit to be slipped from the main hook 1 in a direction opposite to that in which it was inserted.

Having now described my invention, what I claim as new, and desire to secure by Letters Patent, is—

In a device of the character set forth, a main hook formed of a double strand of wire bent in substantially circular form, whose shank extends rearwardly therefrom and terminates in a loop, ring or other analogous device, and a supplemental hook, whose shank lies between the strands constituting the shank of the main hook, and whose hook portion fits between the two strands of which the main hook is formed and extends in an opposite direction to said main hook.

In testimony whereof I have signed this specification in the presence of two subscribing witnesses.

PETER J. ROCK.

Witnesses:
 GEORGE BRUETTE,
 JOSEPH HARRIE.